Jan. 30, 1945.　　A. E. THOMPSON ET AL　　2,368,387
FACSIMILE TELEGRAPH SYSTEM
Filed July 9, 1941　　4 Sheets-Sheet 1

INVENTORS
A. E. Thompson
R. A. Johnston
BY
ATTORNEY

Jan. 30, 1945.  A. E. THOMPSON ET AL  2,368,387
FACSIMILE TELEGRAPH SYSTEM
Filed July 9, 1941  4 Sheets-Sheet 2

INVENTORS
A. E. Thompson
R. O. Salmon
BY
R. P. Morris
ATTORNEY

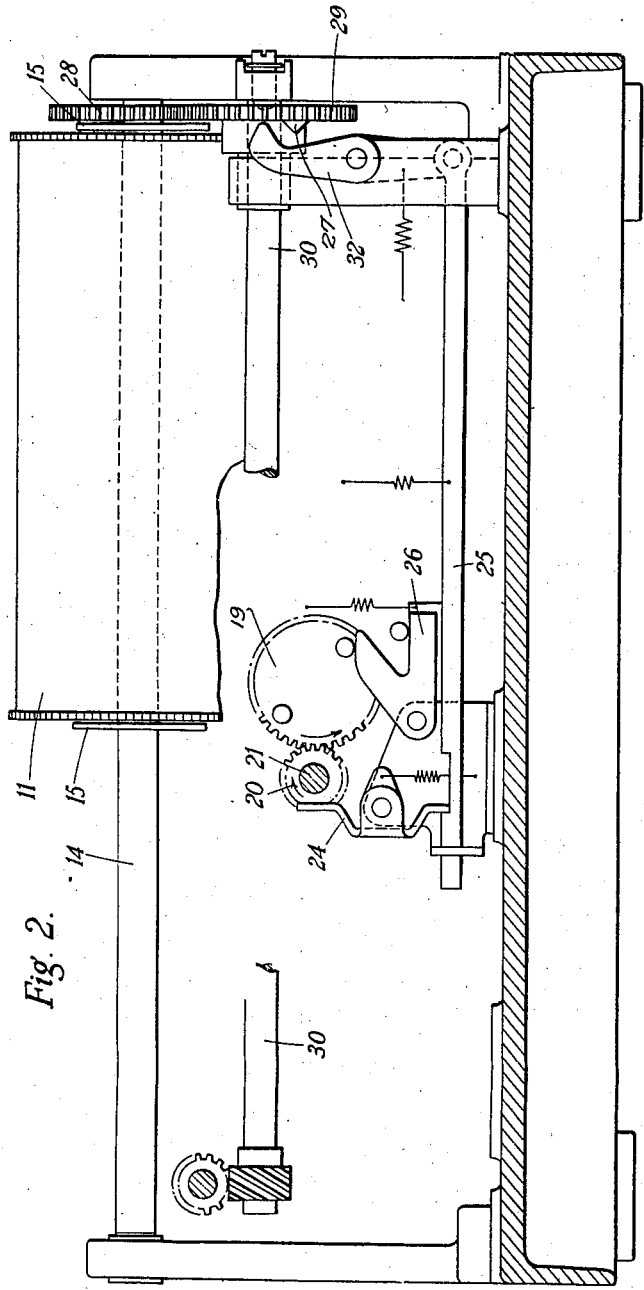

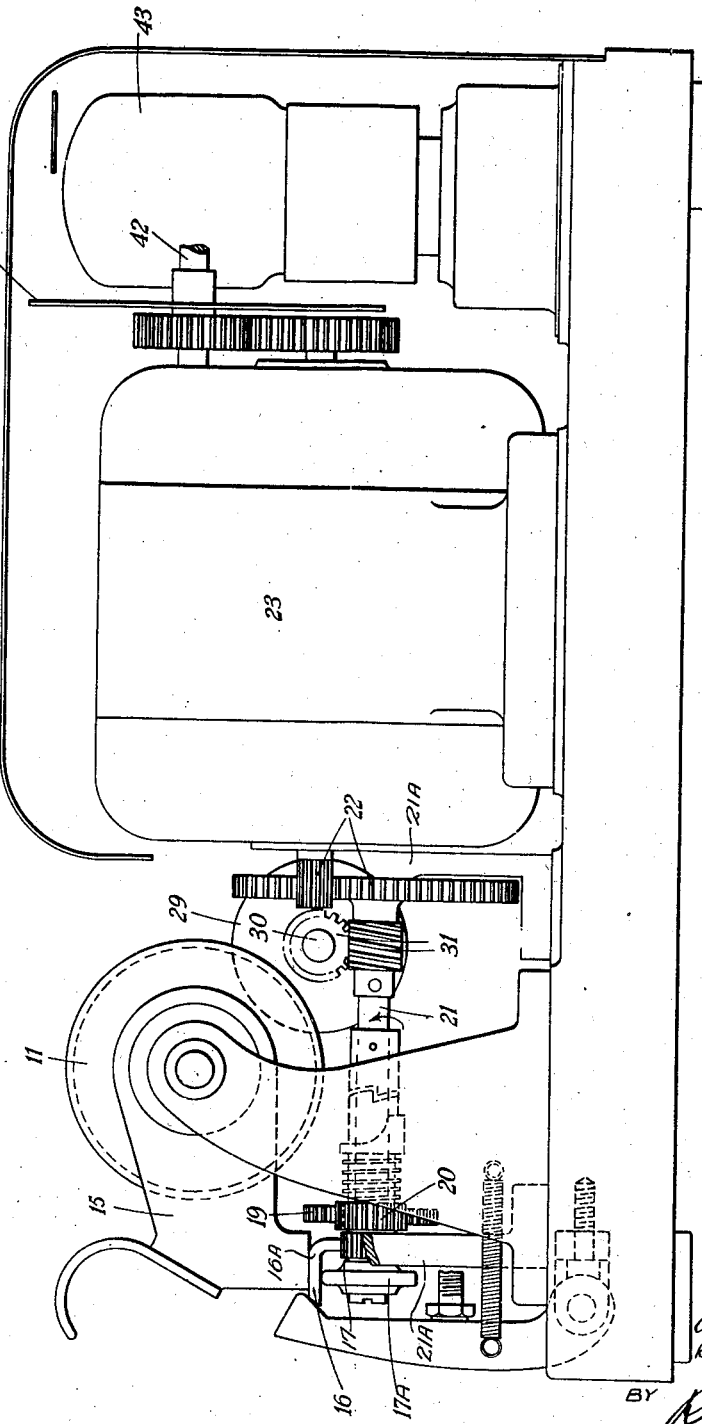

Patented Jan. 30, 1945

2,368,387

UNITED STATES PATENT OFFICE 2,368,387

FACSIMILE TELEGRAPH SYSTEM

Alfred Edward Thompson and Reginald Dennis Salmon, Croydon, England, assignors to Creed and Company Limited, Croydon, England Application July 9, 1941, Serial No. 401,644
In Great Britain July 9, 1940

9 Claims. (Cl. 178—6.6)

This invention relates to facsimile telegraph systems and has for one of its objects to provide simplified and improved means for transmitting subject matter recorded upon a page or a broad web of paper and receiving means for recording on a comparatively narrow paper tape the subject matter transmitted.

Another object of the invention is to provide means for this purpose that is light and compact, suitable for use as a portable machine and which requires a small amount of power to operate it.

According to one feature of the invention means is provided for transmitting subject matter recorded on a page that is wrapped around a transmitting drum in a direction such that the lines of subject matter lie in a plane at right angles to the axis of the drum. Written or printed subject matter recorded on the page is transmitted, but the space between each line is not scanned or transmitted. According to another feature of the invention, means is provided whereby the transmission of subsequent lines of subject matter proceeds in a continuous manner, the transition from one line to another line being carried out in a very short interval of time.

The invention will be better understood from the following description of one embodiment thereof, taken in conjunction with the accompanying drawings, in which:

Fig. 2 is a section on the line 2—2 of Fig. 1;

Fig. 3 is a view from the left-hand end of Fig. 1;

Transmitter

Figure 5:
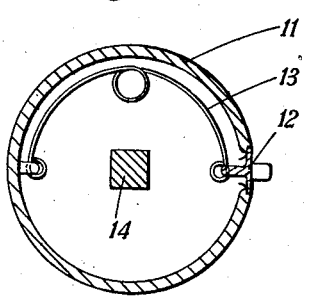
Fig. 5 is a section through the transmitter drum.

A page of written or printed subject matter to be transmitted is wrapped around a drum 11 so that the lines of written or printed matter lie circumferentially, i. e. in a plane at right angles to the axis of the drum. A lengthwise slit is provided in the surface of the drum and is normally covered by a flat narrow bar 12 (Fig. 5) held flush with the surface of the drum by a spring 13 inside the drum. The two vertical edges of the paper are gripped between the juxtaposed edges of the bar and drum.

Figure 1:
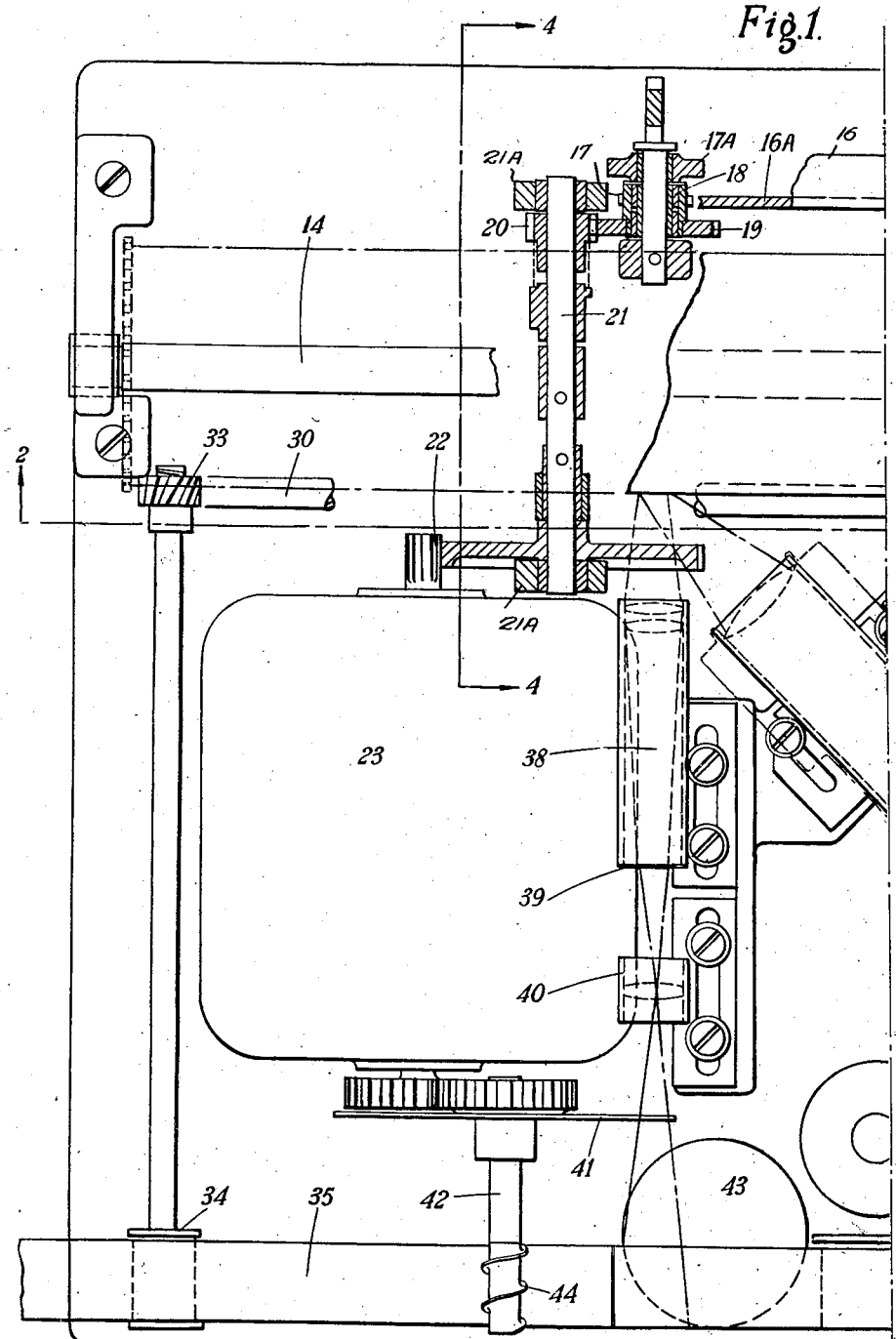
Figs. 1 and 1A is a plan view of a combined transmitter and receiver.
Figure 1A:
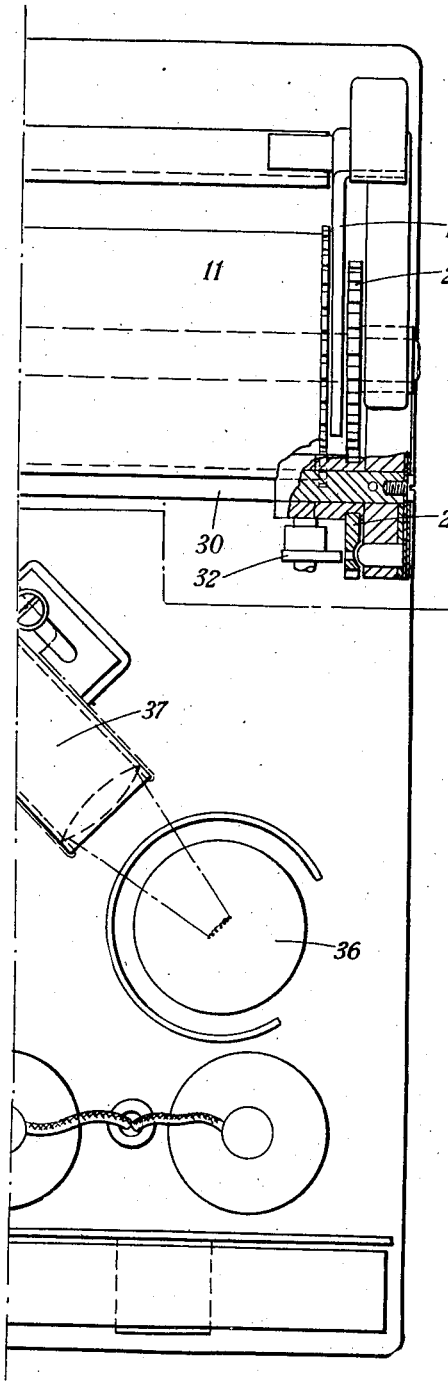
Figure 4:
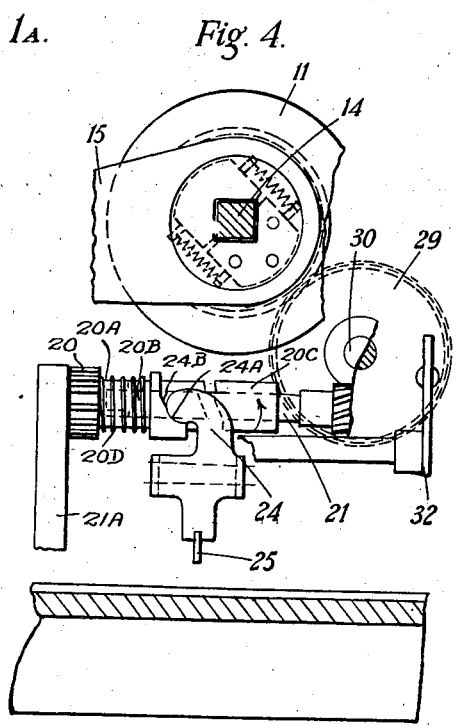
Fig. 4 is a section on the line 4—4 of Fig. 1.

The drum is mounted upon a splined or square-sectioned shaft 14, so that the drum is free to slide along the shaft but not to rotate thereon. Means comprising a pair of spring pressed members shown in Fig. 4 are provided to eliminate any angular rattle on the splined shaft. The drum is held between two end plates 15 joined together by a bar 16 Fig. 3 having on its lower edge 16A teeth which are adapted to engage with a small pinion 17 carried on a sleeve 18 which also carries a larger gear wheel 19 meshing with a small pinion 20 mounted to turn freely upon a spindle 21 that is driven through suitable gearing 22 from a driving motor 23. Spindle 21 edge 16A teeth which are adapted to engage with is supported in suitable bearings in uprights 21A. A roller for partially supporting bar 16 is indicated by reference character 17A. Pinion 20 is adapted to be clutched to the driven spindle 21 by a half revolution clutch, preferably of a well known kind used on teletype direct keyboard transmitters. In accordance with a clutch of this type pinion 20 is formed on a sleeve that turns on shaft 21, the sleeve being constantly connected by a spline arrangement 20A to a second sleeve 20B on opposite sides of which are formed cams, 24B. Cooperating teeth, according to well known practice are formed at the end of sleeve 20B and on the end of a third sleeve 20C pinned to shaft 21. Spring 20D tends to cause the teeth on the respective sleeves to engage thus causing gear 20 to be turned with shaft 21. The clutch is under the control of a detent member 24 Fig. 4 that normally holds it disengaged therefrom. The nose 24A of the detent normally is in the path of cams 24B, either of which may engage the nose of the detent and with the continued rotation of the shaft sleeve 20B will be cammed to the left on shaft 21 against the pressure of spring 20D until the teeth of the respective clutch members disconnect causing the rotary movement of gear 20 to cease. The detent member 24 is under the control of a releasing latch 25 and cam lever 26 controlled by a cam 27 mounted upon or driven from the square shaft 14 carrying the paper drum. The cam lever, releasing latch and detent are arranged so that upon each actuation of the cam lever the detent is operated to allow the clutch to make one half revolution only.

Upon one end of the square shaft 14 carrying the paper drum 11 is mounted a gear wheel 28 meshing with a second gear wheel 29 mounted upon a shaft 30 driven by means of a worm and worm wheel gearing 31 from the driving motor 23. The second mentioned gear wheel 29 is located on the driven shaft 30 by means of a spring loaded arm 32 adapted to engage in one or other of a number of holes or depressions in the side of the gear wheel. The driven shaft 30 is also connected through worm and worm wheel gearing 33 with the driving roll 34 for a paper tape 35 associated with the receiving mechanism.

A lamp 36 having a straight filament is arranged so that an image of the filament is projected by means of a lens system 37 on to the surface of the paper on the drum 11, the image of the filament forming a line parallel to the axis of the drum. A second lens system 38 is arranged to project an image of the brightly illuminated element of the page on to a metal screen 39 provided with a narrow horizontal slit arranged so that the centre of the image of said element falls upon the centre of the slit. A third lens system 40 is arranged so that an image of the slit is projected on to one side of a disc 41 mounted on a spindle 42 driven from the motor 23. The disc 41 is provided with holes arranged in spiral form such that successive holes pass across successive elemental portions of the image of the slit. A photo-electric cell 43 is mounted on the other side of the disc so that light passing through the holes in the disc may fall into the cell. Closely associated with the photo-electric cell is a thermionic amplifier suitable for controlling a radio transmitter valve.

The various parts of the gearing are arranged so that the drum 11 is rotated by an amount equal to the width of the slit for each revolution of the scanning disc 41, while for each release of the clutch controlled by the detent 24 the drum 11 is moved endways along the shaft upon which it is mounted by an amount equal to the distance between successive lines of subject matter, the drum meanwhile rotating a distance less than the width of the slit.

The motor 23 is preferably provided with a centrifugal speed governor.

Receiver

A tape pressure roller not shown is arranged to hold the receiving tape 35 against the feeding roller 34.

The spindle 42 which carries the scanning disc 41 also carries a receiving printing worm 44 below which is mounted on electro-magnet controlled by the received signals preferably through a signalling amplifier. The printing worm comprises a knife edge formed as a screw thread having two complete turns. An inking roller not shown is arranged to rest lightly against the worm.

The armature of the electro-magnet carries an extension bearing a knife edge arranged in the vertical plane passing through the axis of the printing worm. The receiving paper passes between the printing worm and the knife edge on the electro-magnet armature. The length of the knife edge is at least equal to the length of the worm.

Operation

The arrangement is such that the page carrying the message to be transmitted rotates at a constant speed on the drum 11. Light is reflected therefrom and an image of a narrow horizontal portion thereof falls upon the scanning disc 41, the holes in which allow light from successive elemental portions of the image to impinge upon the photo-cell 43.

Each time the bar 12 in the drum 11 passes the position where the image of the filament can fall upon it, the cam 27 operates the detent to release the clutch to drive the drum endways to bring the next line of subject matter into the reading position. This subject matter in the form of characters marked upon the page will cause the light reflected from different portions thereof to vary in intensity. These variations will be transformed by the photo-cell into variations of electric current able to control the radio transmitter.

It is to be noted as one of the advantages of this invention that a considerable saving of time may result from omitting the scanning of the blank space between lines of type- or handwritten matter. The length of the slit which is scanned by the disc 41 may be equal to the depth of the lettering, but the displacement of the drum after the scanning of each circumferential strip will be greater than the length of the slit, according to the spacing between the lines.

The received signals after amplification control the electro-magnet, the movements of the armature of which cause the knife edge carried thereby to strike the moving paper tape against the rotating printing worm 44. At the points where the knife edge carried by the armature intersects the knife edge of the printing worm, an ink mark is made on the paper tape. Thus the variations in received current are translated into marks on the paper tape, the arrangement of said marks corresponding to the transmitted message.

It will be understood that because of the double turn of the screw thread on the printing worm 44, each stroke of the armature makes two simultaneous marks on the paper tape thus building two reproductions of the transmitted message simultaneously. The position of each reproduction on the tape will depend upon the phase relationship of the transmitting scanning disc and the receiving printing worm. If the speed of the driving motor in the receiving machine does not correspond exactly with the speed of the transmitting machine, this phase relationship will vary and consequently each reproduction will traverse the tape in a diagonal direction. Thus at any moment the record may comprise two whole reproductions one above the other, or one whole reproduction with separate portions of the second reproduction above and below it. The result is such that the received message is clearly recorded at all times in at least one line irrespective of exact phase relationship between the transmitting and receiving shafts.

It will be appreciated that the facsimile signals may be transmitted over any telegraph or telephone channel of communication.

It should be understood that the invention is not limited to the specific embodiment described as this is given by way of example, and various modifications may readily be made by those skilled in the art.

It should be further understood that the invention is not limited to the arrangement wherein the page of subject matter is wrapped around a drum but means may be provided whereby the page may be returned to the beginning of a line as on a start-stop teleprinter or a typewriter, the effect being that the scanning is done line by line so that the received message may be printed upon a comparatively narrow tape as in the case of the previous embodiment described herein.

Again, it will be evident that the method of scanning by presenting a slit-like portion of the surface to a scanning means which analyses it into a single row of discrete elements, is that which is particularly the subject matter of our copending British patent application No. 9722/40. Hence all the possibilities there envisaged, are to be understood as coming, so far as possible, within the scope of the present invention. It is desired to mention especially the simplified optical system of Fig. 3 or 4 of the copending case.

What is claimed is:

1. A facsimile telegraph transmitter for transmitting matter written in lines upon a message sheet, comprising, a drum about which the sheet is wrapped with its vertical edges lengthwise, means for scanning a circumferential strip of the sheet including a line of written matter, and means operative upon said drum reaching a predetermined position relative to said strip for displacing the drum lengthwise between the scanning of consecutive strips.

2. An arrangement for transmitting by facsimile telegraphy matter written in parallel lines upon a message sheet, comprising, a drum about which the sheet is wrapped with the written lines extending circumferentially, means for scanning an elementary strip extending widthwise of a line, means for rotating the drum to present successive elementary strips along the line for scanning, and means operative upon said drum reaching a predetermined rotary position relative to a line for jumping the drum axially to present successive lines for scanning.

3. An arrangement for transmitting by facsimile telegraphy matter consisting of signs or symbols in parallel rows of substantially uniform width upon a sheet, comprising, a drum about which the sheet is wrapped with the rows extending circumferentially, means for presenting for scanning a slit-like elemental portion of the strip-like surface of the sheet carrying a single row of signs, which slit-like elemental portion extends transversely across the strip-like surface, means for analysing the slit-like elemental portion into a succession of discrete spot-like elements, means for continuously driving the analysing means and for continuously rotating the drum so that the strip-like surface is advanced by the width of the slit-like elemental portion in the time taken to analyse one slit-like elemental portion, and means for intermittently displacing the drum axially, once every rotation, by an amount equal to the spacing of the rows.

4. A combined transmitting and receiving unit for facsimile telegraphy adapted to transmit and receive matter appearing in parallel lines comprising, a drum about which a message sheet may be wrapped for transmission, means for scanning the message sheet in a series of parallel strips each strip containing one line of said matter, means for transmitting signals modulated in accordance with the markings in the strips, means for receiving such signals, and means for marking a continuous tape in accordance with the signals received, arranged to inscribe said lines successively in series on the tape.

5. An arrangement for transmitting by facsimile telegraphy matter consisting of markings in parallel rows of substantially constant width upon a rectangular sheet, comprising, a drum about which the sheet may be wrapped, a clamp extending lengthwise of the drum periphery for clamping the edges of the sheet which are normal to the rows, a light source, a lens system for projecting a slit-like beam of light from the source onto the sheet so that it extends lengthwise of the drum, the length of the slit being substantially the same as the width of a row, a lens system for focussing the light reflected from the sheet into a beam and for directing the beam into a photoelectric cell, a scanning disc with a helical array of apertures in the path of the reflected beam, so that rotation of the scanning disc will pass to the photoelectric cell successive portions along the length of the slit, a driving motor, a permanent driving connection between the motor and the scanning disc, a permanent driving connection including step-down gearing between the motor and the drum so that for each complete rotation of the scanning disc the surface of the sheet is advanced by the width of the slit, a driving connection between the motor and the drum for advancing the drum axially, and means for establishing said last-mentioned connection only when the clamp is exposed to the beam of light, said means and continuing to function only until the sheet has been lined up to expose the next row.

6. An arrangement as claimed in claim 5, in which the light source consists of a lamp having a straight filament, the image of the filament constituting the slit.

7. Apparatus for transmitting by facsimile telegraphy matter appearing in parallel rows upon a message sheet, comprising a drum about which the message sheet may be wrapped for transmission with the rows extending circumferentially, means for rotating the drum, means for scanning a row of matter during a single revolution of the drum and means for shifting the relative position of the cylinder and scanning means after the scansion of a line of matter to bring the succeeding line into position for scanning during the succeeding revolution of the cylinder.

8. Apparatus according to claim 7, adapted for use with a message sheet in which the successive rows of material are substantially spaced apart, also including means acting upon said scanning means whereby said scanning means scans only the axial width of a row and including additional means cooperating with said cylinder shifting means so that said last-mentioned means will shift the cylinder lengthwise after the scanning of a row through a distance sufficient to bring the succeeding row into scanning position, whereby the accomplishment of the scanning process upon the space between said rows is avoided and temporal efficiency is promoted.

9. Apparatus according to claim 7, also including a sheet clamping device extending lengthwise of the cylinder, means for shifting the relative position of said cylinder and scanning means, and determining means making said shifting means operative while said clamping device is in register with said scanning means.

ALFRED EDWARD THOMPSON.
REGINALD DENNIS SALMON.